(12) United States Patent
Groell

(10) Patent No.: US 6,951,060 B2
(45) Date of Patent: Oct. 4, 2005

(54) METHOD FOR TRANSMITTING CONTROL COMMANDS FROM A TRANSMITTING ELEMENT TO A MEASURING PROBE

(75) Inventor: Klaus Groell, Waging am See (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 23 days.

(21) Appl. No.: 10/767,081

(22) Filed: Jan. 29, 2004

(65) Prior Publication Data

US 2004/0184415 A1 Sep. 23, 2004

(30) Foreign Application Priority Data

Jan. 29, 2003 (DE) .......................................... 103 03 551

(51) Int. Cl.⁷ .............................................. G01B 5/008
(52) U.S. Cl. .............................. 33/558; 33/503; 33/556; 33/561; 700/95; 700/194; 340/679; 455/39
(58) Field of Search .......................... 33/556–561, 503; 455/39, 67.1, 67.7, 500, 134–135; 700/95, 194, 195; 340/679

(56) References Cited

U.S. PATENT DOCUMENTS

| | | | | |
|---|---|---|---|---|
| 4,099,437 A | * | 7/1978 | Stavrou et al. | ................ 84/617 |
| 4,636,093 A | * | 1/1987 | Nagasaka et al. | ............ 374/186 |
| 6,115,647 A | * | 9/2000 | Carli et al. | .................. 700/194 |
| 6,300,871 B1 | * | 10/2001 | Irwin et al. | ............ 340/539.28 |
| 6,389,158 B1 | * | 5/2002 | Pettersen et al. | ............ 382/154 |
| 6,472,981 B1 | * | 10/2002 | Fuge et al. | ............... 340/539.1 |
| 6,665,945 B2 | * | 12/2003 | Hagl et al. | ...................... 33/561 |
| 6,839,563 B1 | * | 1/2005 | Kirby et al. | ................... 33/503 |

FOREIGN PATENT DOCUMENTS

EP  1 130 557  9/2001

* cited by examiner

Primary Examiner—Christopher W. Fulton
Assistant Examiner—Yaritza Guadalupe
(74) Attorney, Agent, or Firm—Kenyon & Kenyon

(57) ABSTRACT

In a method for the wireless transmission of a control command from a transmitting element to a measuring probe using electromagnetic signals, the control command includes at least one bit sequence which is made up of high bits and at least one low bit. The high bits are produced by the enveloping curve of a plurality of electromagnetic signals which recur with a carrier frequency. Within one bit sequence, at least one low bit is transmitted at least once between two high bits.

13 Claims, 4 Drawing Sheets

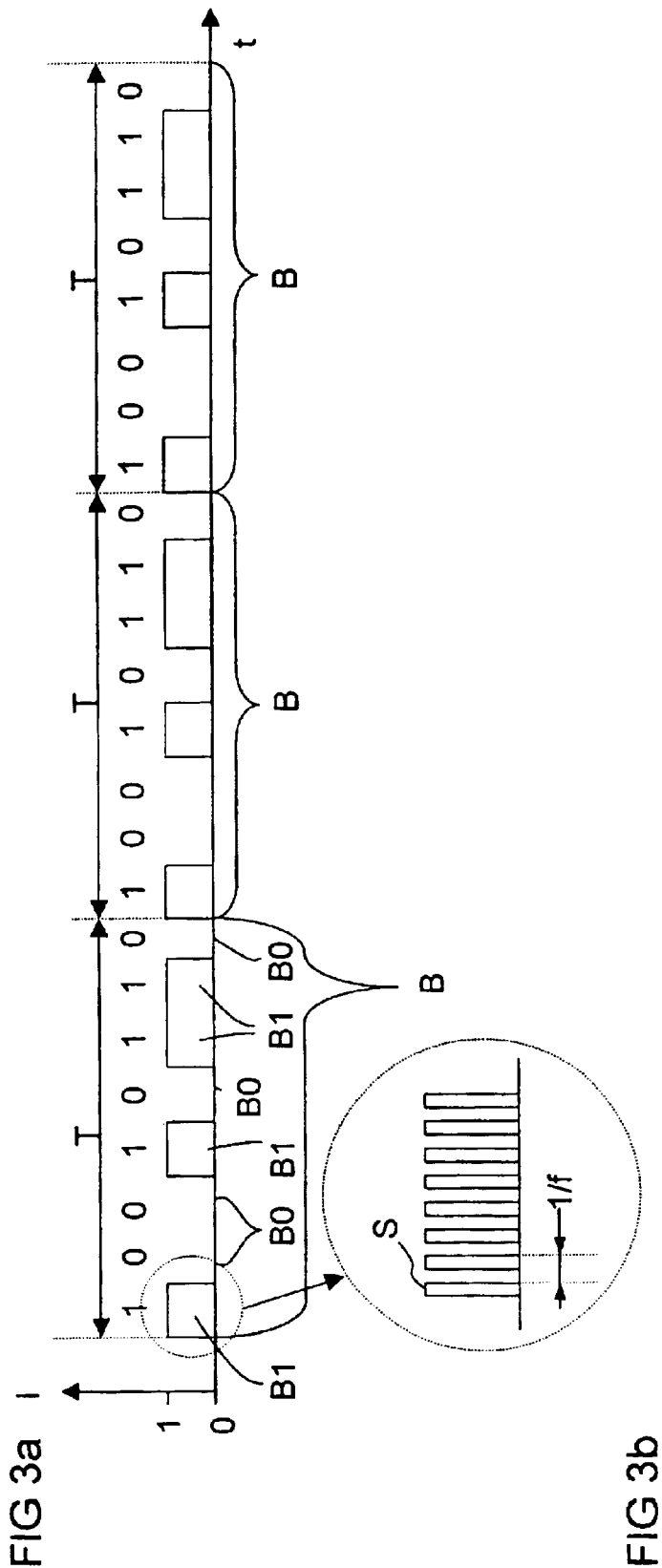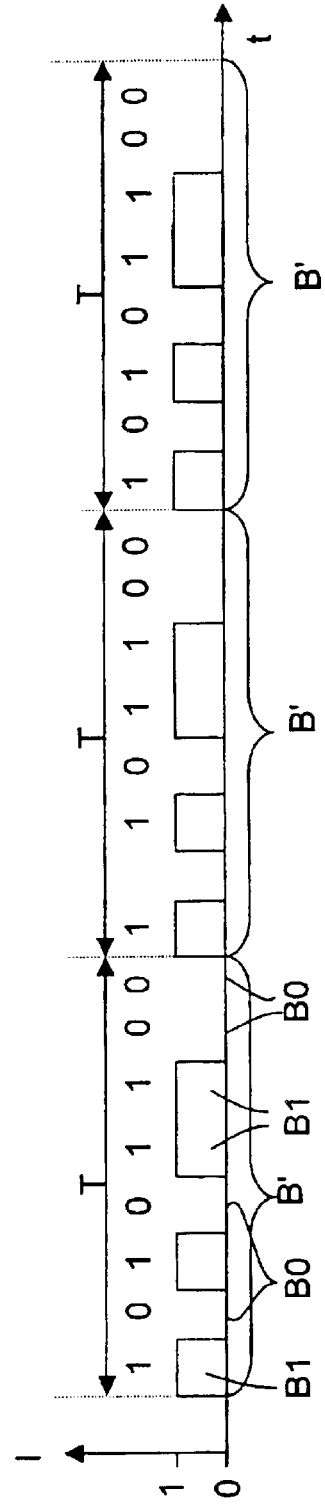
FIG 3a
FIG 3b

METHOD FOR TRANSMITTING CONTROL COMMANDS FROM A TRANSMITTING ELEMENT TO A MEASURING PROBE

CROSS-REFERENCE TO RELATED APPLICATIONS

The present application claims priority to Application No. 103 03 551.6, filed in the Federal Republic of Germany on Jan. 29, 2003, which is expressly incorporated herein in its entirety by reference thereto.

FIELD OF THE INVENTION

The present invention relates to a method for transmitting control commands from a transmitting element to a measuring probe in a probe system.

BACKGROUND INFORMATION

Probe systems of this kind are used, for example, for sensing the positions of workpieces that are clamped into material-working machines, such as milling machines. These probe systems often have a stationary part, which is secured to a fixed element of the material-working machines, and a part that is movable relatively thereto, which is often described as a measuring probe that is mounted on a movable element of material-processing machines, for instance on a milling spindle. In this context, the measuring probe includes a probe element that is deflectable out of a rest position and that generates a switch-on signal in response to a deflection out of its rest position. Rest position of the probe element is understood to be a position where the probe element does not have any contact with a workpiece. In response to contact of the probe element with the workpiece, the probe element is deflected out of its rest position.

In so-called wireless probe systems, such a switch-on signal is transmitted by the measuring probe as an electromagnetic signal, in particular as an infrared signal, to the stationary part. In this part, the output signals of the probe system are analyzed in order to determine the occurrence of switch-on signals (thus a deflection of the probe element).

Outside of the measuring operation times, the measuring probe is typically in a stand-by state. Shifting the measuring probe from its stand-by state to a measuring-operation state requires a power-up or activation process.

European Published Patent Application No. 1 130 557 describes a method for the wireless activation of a measuring probe. In this context, infrared light pulses are continuously transmitted at a predefined frequency from a stationary transmitting element of a probe system to a measuring probe. Because this method is not insusceptible to errors, the signal must be received for a certain time duration by the measuring probe in order to achieve an acceptable transmission reliability. However, if interference is also present within the frequency range in question during this time period, the measuring probe interprets the interference signal as an activation signal as well.

For this reason, it is an aspect of the present invention to provide a method for the wireless transmission of a control command from a transmitting element of a probe system to a measuring probe of a probe system that may be immune to interference and may be simple to implement.

SUMMARY

The above and other beneficial aspects of the present invention may be achieved by providing a method and device as described herein.

In accordance with an example embodiment of the method of the present invention, a control command transmitted to a measuring probe is made up of at least one bit sequence, high bits being generated by the enveloping curve of a plurality of electromagnetic signals recurring with a carrier frequency. In addition, to enhance the transmission reliability, at least one low bit, or a plurality of low bits in succession, is transmitted within one bit sequence at least once between two high bits. By transmitting a bit sequence or a code word, the transmission reliability may be significantly increased, e.g., since the bits are made up of signals modulated with a carrier frequency.

This method may make possible a simple and reliable data transmission, it being possible for a multiplicity of commands having different functions to be transmitted.

In an example embodiment of the present invention, a comparatively low carrier frequency of less than 50 kHz, e.g., less than 10 kHz is used. In an example embodiment, a carrier frequency of less than 5 kHz is used.

The high bits may be produced by the enveloping curve of at least eight electromagnetic signals recurring with a carrier frequency. This may ensure a high level of transmission reliability.

In the following, a high bit is described as a bit whose level is high compared to the level of a low bit to be distinguished therefrom. For example, the high bit may have a normalized level of 100% or 1, while the low bit has a level of 0% or 0. Alternatively, however, the low bit may also have a normalized level, which represents an intermediate value of between 100% and 0%, and, at any rate, is lower than the level of the high bit.

The high bits are produced by the enveloping curve of a plurality of electromagnetic signals that recur with a carrier frequency. An enveloping curve is understood to be that curve which connects adjacent maxima of the electromagnetic signals by the shortest path. In principle, the same observation may also be made for the low bits. When the low bits have a level of 0, then the enveloping curve is a line on the zero level. If the low bits have a level that represents an intermediate value between 100% and 0%, then these low bits are also produced by the enveloping curve of a plurality of electromagnetic signals that recur with a carrier frequency.

In an example embodiment of the present invention, a method for wireless transmission of a control command from a transmission element to a measuring probe with electromagnetic signals, the control command including at least one bit sequence, the bit sequence including high bits and at least one low bit, includes generating the high bits in accordance with an enveloping curve of a plurality of electromagnetic signals recurring with a carrier frequency, and transmitting one low bit between two high bits within one bit sequence.

The carrier frequency may be lower than 50 kHz and/or lower than 5 kHz.

The method may include generating the enveloping curve in accordance with at least eight electromagnetic signals recurring with the carrier frequency.

The electromagnetic signals may include infrared light pulses.

The control command may include a plurality of bit sequences transmitted in series.

The method may include converting the electromagnetic signals into one of pulsed electric currents and voltages in a receiver element of a probe system, and digitizing the one of the pulsed electric currents and voltages. The electromagnetic signals may be converted in the converting step in the measuring probe.

The method may include triggering, by the control command, one of an activation of the measuring probe from a stand-by state and a deactivation of the measuring probe into the stand-by state. A first control command may trigger the activation of the measuring probe, and a different control command may trigger deactivation of the measuring probe.

The bit sequence may include blocks of high bits having different temporal lengths.

In an example embodiment of the present invention, a device for wireless transmission of a control command from a transmission element to a measuring probe with electromagnetic signals, the control command including at least one bit sequence, the bit sequence including high bits and at least one low bit, includes an arrangement configured to generate the high bits in accordance with an enveloping curve of a plurality of electromagnetic signals recurring with a carrier frequency, and an arrangement configured to transmit one low bit between two high bits within one bit sequence.

In an example embodiment of the present invention, a device for wireless transmission of a control command from a transmission element to a measuring probe with electromagnetic signals, the control command including at least one bit sequence, the bit sequence including high bits and at least one low bit, includes means for generating the high bits in accordance with an enveloping curve of a plurality of electromagnetic signals recurring with a carrier frequency, and means for transmitting one low bit between two high bits within one bit sequence.

Further aspects of the circuit arrangement according to the present invention and details pertaining thereto, as well as measuring probes equipped with the arrangement, are derived from the following description of exemplary embodiments, on the basis of the appended Figures.

BRIEF DESCRIPTION OF THE DRAWINGS

FIG. 3a illustrates a course of control commands for activating the measuring probe.

FIG. 3b illustrates a course of control commands for deactivating the measuring probe.

DETAILED DESCRIPTION

Figure 1:
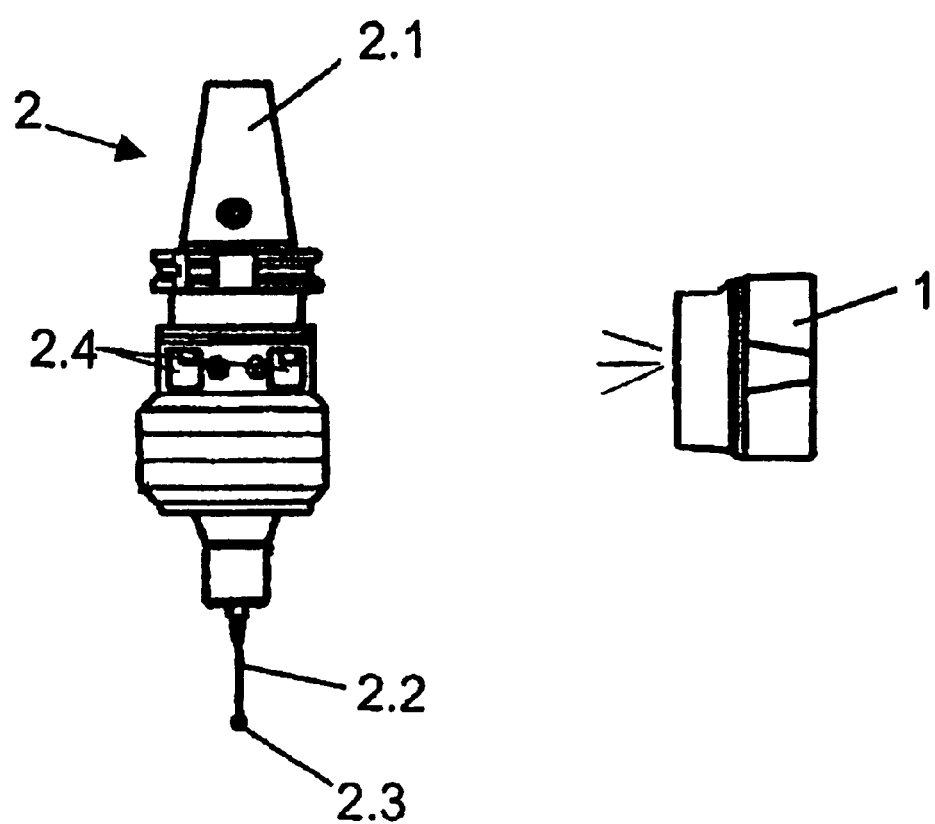
FIG. 1 is a schematic representation of a probe system.

FIG. 1 shows a probe system used for determining or sensing the position and contour of a workpiece clamped in a machine tool, for example, a milling machine. The probe system includes a transmitting element 1 and a measuring probe 2. Measuring probe 2 is insertable by a cone 2.1 into a spindle of the particular machine tool, while transmitting element 1 is mounted so as to be stationary or fixed on the machine tool. In FIG. 1, transmitting element 1 has light-emitting diodes for emitting infrared light.

At its end opposing cone 2.1, measuring probe 2 has a probe element in the form of a feeler 2.2 having a probing contact sphere 2.3, which is mounted so as to be movable in all directions, in the housing of measuring probe 2. Typically, the rest position of feeler 2.2 is on the axis of symmetry of measuring probe 2, as shown in FIG. 1. A photodiode 2.5 (FIG. 2) is situated behind each of windows 2.4 which are transmissive to infrared light and are distributed over the periphery of measuring probe 2.

Figure 2:
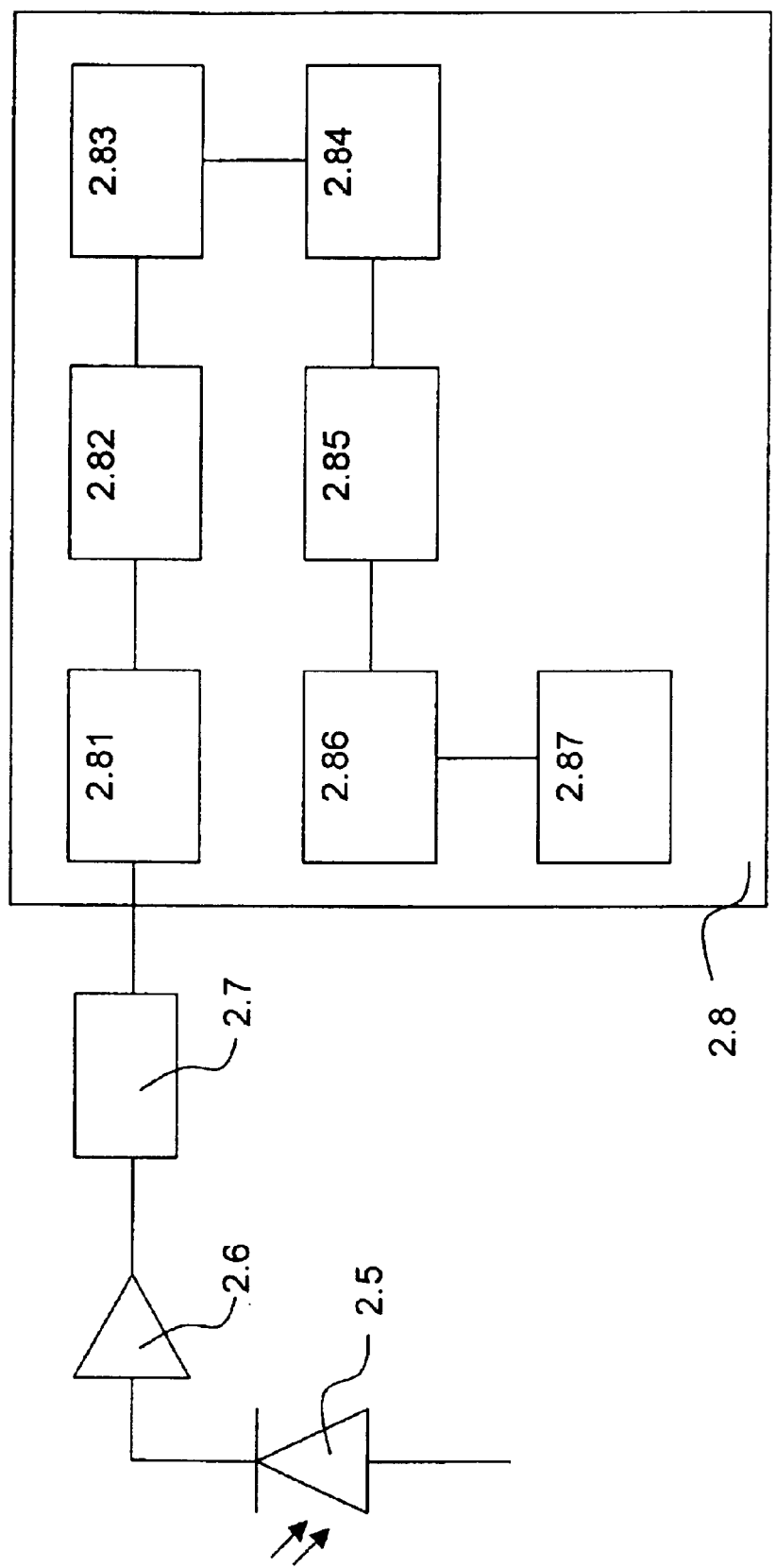
FIG. 2 schematically illustrates an electric block diagram of the measuring probe.

An electric block diagram of measuring probe 2 is shown in FIG. 2. Incident infrared light may be selectively converted by photodiodes 2.5 into photoelectric currents or photoelectric voltages, while daylight is filtered out, for example. In this manner, electro-magnetic signals, in the exemplary embodiment in the form of infrared light pulses S, may be converted into electric pulses or electric currents. These electric currents are then amplified in an amplifier 2.6, converted into electric voltage signals, and the voltage signals are subsequently fed to a bandpass filter 2.7. The filtered voltage signals subsequently arrive in a CPU 2.8 (central processing unit) for further processing.

Measuring probe 2 is supplied with the necessary voltage by a battery which is inserted in measuring probe 2. To ensure a long service life of the battery of measuring probe 2, measuring probe 2 may be kept in a power-saving stand-by state outside of the actual measuring processes.

Thus, before a measurement is begun, measuring probe 2 may be activated. This is undertaken by a wireless connection between transmitting element 1 and measuring probe 2. The repeated transmission of a bit sequence B (in the illustrated example, 10010110), given optimal transmission quality, three times, in the exemplary embodiment presented here, generates a control command, which, once properly received by measuring probe 2, triggers activation of measuring probe 2. For this purpose, in accordance with FIG. 3a, electromagnetic signals, thus here in the form of infrared light pulses S, are transmitted by a light-emitting diode of transmitting element 1. Plotted on the ordinate in each of FIGS. 3a and 3b is intensity I of infrared light pulses S, while time t is shown on the abscissa. For the data transmission, infrared light pulses S are modulated with a carrier frequency f, which in this instance is 1024 Hz, so that infrared light pulses S have a period of 1/f, thus 0.9766 ms. By definition, the level of modulated infrared light pulses S should be 100%, i.e., one. In the illustrated example, a high bit B1 is formed by the enveloping curve of eight infrared light pulses S. Accordingly, the temporal length of a high bit B1 is 8·1/f, thus 7.8125 ms.

As soon as measuring probe 2 is activated, it feeds information to this effect back to transmitting element 1. As a result of this feedback information, the transmission of bit sequence B is ended. However, if no feedback information is received from transmitting element 1, bit sequence B is repeatedly transmitted up to a predefined limiting time. For the evaluation of the electric currents produced by photodiodes 2.5, it may be provided that there are no pauses between two transmitted bit sequences B, as shown in the exemplary embodiment. Alternatively, however, there may also be pauses having a defined length between bit sequences B, so that the pause length may be considered for the evaluation in the measuring probe.

Carrier frequency f, which, at 1024 Hz is comparatively low, may provide that an amplifier 2.6 and, above all, a CPU 2.8, which require relatively little current, may be used in battery-operated measuring probe 2. When a high carrier frequency f is used, in measuring probe 2, one may have to select amplifiers 2.6 which require higher currents and thus may shorten the lifetime of the battery.

To produce a control command that is insusceptible to interference, at least one low bit B0 is transmitted within bit sequence B between two high bits B1. A low bit B0 is transmitted by the short-duration switching off of the light diodes of transmitting element 1, so that no infrared light pulse S, or expressed differently, one infrared light pulse S having level zero is received. Alternatively, however, to form a low bit B0, the level of infrared light pulses S may merely be reduced, for example to 50%. In this case, low bits B0 having a reduced level are then produced from the enveloping curve of infrared light pulses S. As do high bits B1, low bits B0 also have a temporal length of 7.8125 ms in each instance.

When defining bit sequences B, B', it may be provided that selected bit sequence B, B' has blocks of high bits B1 having different temporal lengths. For example, bit sequence B (10010110) in accordance with FIG. 3a has three blocks of high bits B1, the first and the second block having one bit length, thus 7.8125 ms. On the other hand, the third block has a temporal length of 2·7.8125 ms=15.625 ms. Thus, the temporal length of a block of high bits B1 is understood to be that time during which the level of high bits B1 is not interrupted by a low bit B0. Accordingly, adjacent high bits B1 form a block, an individual high bit B1 also being understood as a block (having minimal temporal length). The defining of bit sequences B, B' having blocks of high bits B1 with different temporal lengths contributes to an increase in the transmission reliability, because, e.g., disturbances caused by interference from two light sources may be effectively reduced in this manner. Such interference occurs, for example, in lighting equipment made up of a plurality of neon tubes. The light emissions from a plurality of neon tubes may cause a superposition, which, similarly to a beat, has fluctuating amplitudes. However, this amplitude characteristic is typically symmetrical and is, therefore, able to be easily distinguished from a bit sequence B, B' having blocks of high bits B1 having different temporal lengths.

In this manner, in accordance with FIG. 3a, a corresponding bit sequence B of four high bits B1 and four low bits B0 is produced. Accordingly, bit sequence B has a temporal length T of 62.5 ms.

As already mentioned, infrared light pulses S are converted using photodiode 2.5 into pulsed electric currents. Once these are amplified in amplifier 2.6, for purposes of masking out interference, the corresponding voltage signals are filtered in bandpass filter 2.7. In this manner, interference signals, which do not lie within the range of carrier frequency f, may be substantially eliminated. The filtered voltage signals are then fed to CPU 2.8 where they are then digitized in an analog-digital converter 2.81. With respect to carrier frequency f, the digitization is carried out with a fourfold oversampling rate, thus with 4096 Hz in the illustrated example. In this manner, from the analog voltage signals, digital data are produced, which are subsequently further processed in software operations.

Figure 4:
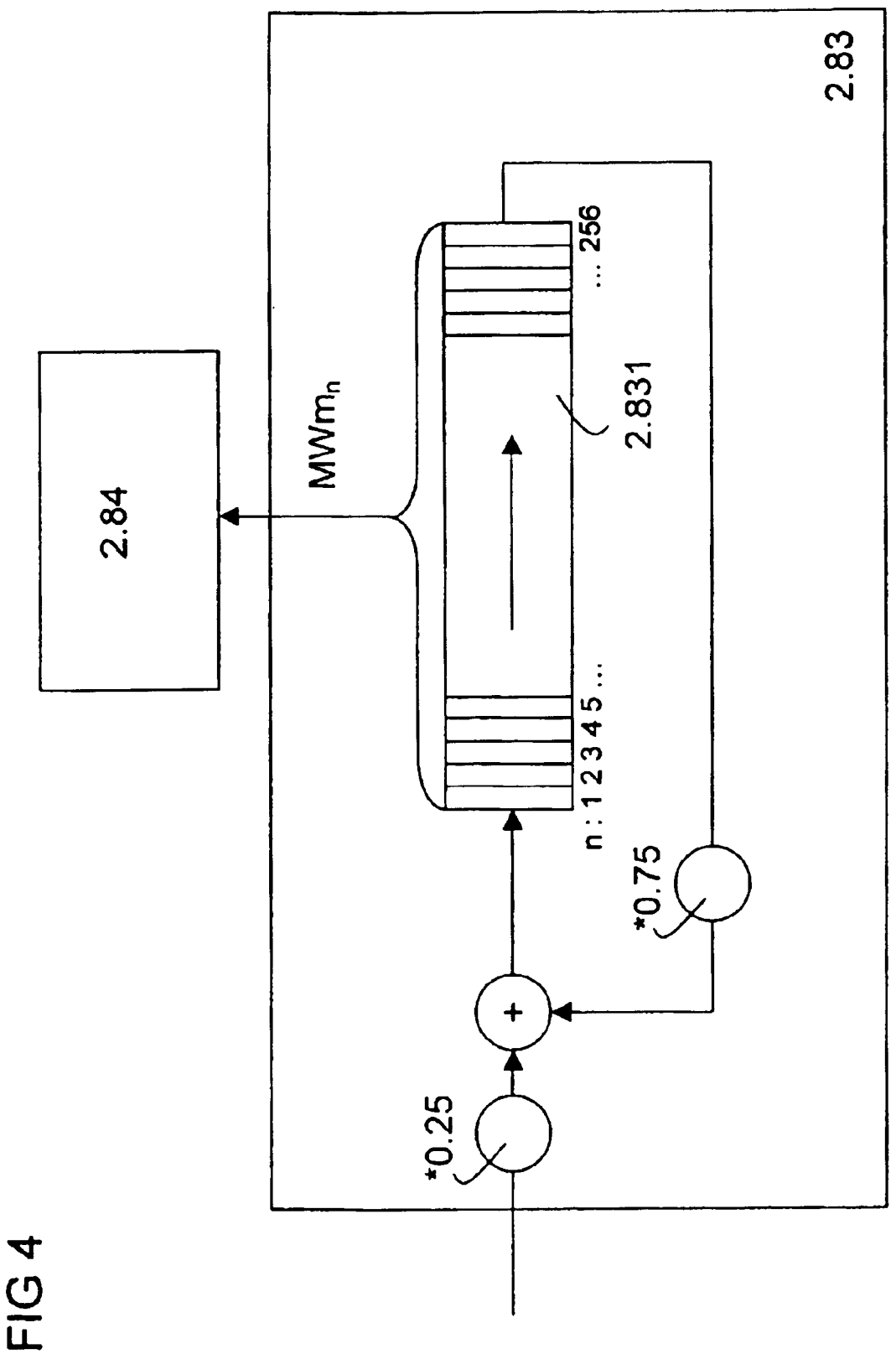
FIG. 4 is a flow diagram illustrating an averaging method.

In the next step, a digital filter 2.82 is used, so that other still existing interference information may still be significantly reduced. Data filtered in this manner are then averaged. In the illustrated example, to produce average values $MWm_n$, no arithmetic averaging is undertaken, but rather a special averaging method which is explained on the basis of FIG. 4: In the averaging method, by the fourfold oversampling with respect to carrier frequency f, per bit sequence B, B' (which is composed of eight bits having eight signals each from infrared light pulses S) 4·8·8, thus 256 values are read into a shift register 2.831. However, before these values are recorded by shift register 2.831, they are multiplied by the number 0.25. The values multiplied by 0.25 are subsequently added to a value coming from the shift register (fed back through a loop), to produce a cumulative value. This cumulative value is then passed with a clock pulse of 4096 Hz through shift register 2.831, new cumulative values being continually recorded in the shift register with the same clock pulse. Following a time period of 256/(4096 Hz), thus 62.5 ms, the cumulative value again exits shift register 2.831 and is then multiplied by number 0.75, to now be available to be added to new values. At the same time, the 256 cumulative values $MWm_n$ of shift register 2.831 are transmitted to demodulator 2.84. Thus, cumulative values $MWm_n$ relate to the values in n cells of shift register 2.831 following the m-th pass through the loop.

Typically, following transmission of first bit sequence B, B', the loop may have to be run through many times until average values $MWm_n$ in question reach an expression for the further processing that follows, which ultimately induces a reaction, such as activation of measuring probe 2.

This averaging further enhances the transmission reliability. In a demodulator 2.84, carrier frequency f is subsequently calculated from the generated data, so that, following this step, for high bits B1 and low bits B0, only one number remains which corresponds to the particular level of high bits B1 and of low bits B0.

In normalizer 2.85, the actual levels of high bits B1 and of low bits B0 are then adapted to the levels of a predefined setpoint value. The data of normalized high bits B1 and of low bits B0 are then checked in correlator 2.86 to verify that the difference between the actual level and the setpoint level is formed for each high bit B1 and low bit B0. In the process, all differences formed in this manner are summed. If this sum falls short of a predefined value, the data are deemed valid and finally fed to a three-out-of-four logic 2.87. There it is checked whether three of four successive bit sequences B, B' were correct. When this check test is successfully performed, measuring probe 2 is activated.

At this point, measuring probe 2 is ready for the measuring operation. In response to probing contact sphere 2.3 of feeler 2.2 contacting a workpiece that is clamped into the particular machine tool, feeler 2.2 is deflected out of its rest position. This deflection is recorded by a detector system or sensing array of measuring probe 2, and an infrared signal to this effect is also retransmitted to transmitting element 1, which is mounted so as to be stationary on the machine tool and is also suited for receiving infrared light.

Following the measuring operation, in response to transmission of a further control command in accordance with FIG. 3b, measuring probe 2 is again deactivated and returned to the stand-by state. Control command is made up of bit sequences B' (10101100) transmitted in series, high bits B1, being generated, in turn, from infrared light pulses S modulated by carrier frequency f, while low bits B0 are formed by temporarily switching off the light-emitting diode of transmitting element 1.

Bit sequences B, B' for activating or deactivating measuring probe 2 were selected in a manner that may make it extremely unlikely for there to be any confusion during evaluation in measuring probe 2 because of a data transmission under interference conditions. For this reason, an example combination is made up of bit sequences B, B' 10010110 and 10101100. Generally, suitable bit sequences B, B', thus those that are not easily mixed up, may be ascertained by implementing a computer-supported cross-correlation.

What is claimed is:

1. A method for wireless transmission of a control command from a transmission element to a measuring probe with electromagnetic signals, the control command including at least one bit sequence, the bit sequence including high bits and at least one low bit, comprising:

generating the high bits in accordance with an enveloping curve of a plurality of electromagnetic signals recurring with a carrier frequency; and transmitting one low bit between two high bits within one bit sequence.

2. The method according to claim 1, wherein the carrier frequency is lower than 50 kHz.

3. The method according to claim 1, wherein the carrier frequency is lower than 5 kHz.

4. The method according to claim 1, further comprising generating the enveloping curve in accordance with at least eight electromagnetic signals recurring with the carrier frequency.

5. The method according to claim 1, wherein the electromagnetic signals include infrared light pulses.

6. The method according to claim 1, wherein the control command includes a plurality of bit sequences transmitted in series.

7. The method according to claim 1, further comprising:

converting the electromagnetic signals into one of pulsed electric currents and voltages in a receiver element of a probe system; and digitizing the one of the pulsed electric currents and voltages.

8. The method according to claim 7, wherein the electromagnetic signals are converted in the converting step in the measuring probe.

9. The method according go claim 1, further comprising triggering, by the control command, one of an activation of the measuring probe from a stand-by state and a deactivation of the measuring probe into the stand-by state.

10. The method according to claim 9, wherein a first control command triggers the activation of the measuring probe and a different control command triggers deactivation of the measuring probe.

11. The method according to claim 1, wherein the bit sequence includes blocks of high bits having different temporal lengths.

12. A device for wireless transmission of a control command from a transmission element to a measuring probe with electromagnetic signals, the control command including at least one bit sequence, the bit sequence including high bits and at least one low bit, comprising:

an arrangement configured to generate the high bits in accordance with an enveloping curve of a plurality of electromagnetic signals recurring with a carrier frequency; and an arrangement configured to transmit one low bit between two high bits within one bit sequence.

13. A device for wireless transmission of a control command from a transmission element to a measuring probe with electromagnetic signals, the control command including at least one bit sequence, the bit sequence including high bits and at least one low bit, comprising:

means for generating the high bits in accordance with an enveloping curve of a plurality of electromagnetic signals recurring with a carrier frequency; and means for transmitting one low bit between two high bits within one bit sequence.

* * * * *